United States Patent
Li et al.

(10) Patent No.: US 12,486,324 B2
(45) Date of Patent: *Dec. 2, 2025

(54) CHIMERIC ANTIGEN RECEPTOR CELLS TARGETING ROBO1, PREPARATION METHOD AND USE THEREOF

(71) Applicant: Asclepius (Suzhou) Technology Company Group Co., Ltd., Suzhou (CN)

(72) Inventors: Huashun Li, Suzhou (CN); Baolei Wang, Suzhou (CN); Kunkun Han, Suzhou (CN)

(73) Assignee: Asclepius (Suzhou) Technology Company Group Co., Ltd., Suzhou (CN)

( * ) Notice: Subject to any disclaimer, the term of this patent is extended or adjusted under 35 U.S.C. 154(b) by 153 days.

This patent is subject to a terminal disclaimer.

(21) Appl. No.: 18/319,638

(22) Filed: May 18, 2023

(65) Prior Publication Data

US 2023/0287116 A1  Sep. 14, 2023

Related U.S. Application Data

(63) Continuation of application No. 16/700,401, filed on Dec. 2, 2019, now Pat. No. 11,697,685, which is a continuation of application No. PCT/CN2017/089517, filed on Jun. 22, 2017.

(30) Foreign Application Priority Data

Jun. 2, 2017 (CN) .......................... 201710407619.8

(51) Int. Cl.
| | |
|---|---|
| C07K 16/28 | (2006.01) |
| A61K 40/11 | (2025.01) |
| A61K 40/15 | (2025.01) |
| A61K 40/31 | (2025.01) |
| A61K 40/42 | (2025.01) |
| A61P 35/00 | (2006.01) |
| C07K 14/705 | (2006.01) |
| C07K 14/725 | (2006.01) |
| C12N 5/0783 | (2010.01) |
| C12N 15/867 | (2006.01) |
| A61K 38/00 | (2006.01) |
| A61K 39/00 | (2006.01) |

(52) U.S. Cl.
CPC .......... *C07K 16/2803* (2013.01); *A61K 40/11* (2025.01); *A61K 40/15* (2025.01); *A61K 40/31* (2025.01); *A61K 40/42* (2025.01); *A61P 35/00* (2018.01); *C07K 14/7051* (2013.01); *C07K 14/70517* (2013.01); *C07K 14/70521* (2013.01); *C07K 14/70578* (2013.01); *C12N 5/0636* (2013.01); *C12N 5/0646* (2013.01); *C12N 15/867* (2013.01); *A61K 38/00* (2013.01); *A61K 2039/505* (2013.01); *A61K 2239/17* (2023.05); *A61K 2239/55* (2023.05); *C07K 2317/24* (2013.01); *C07K 2317/55* (2013.01); *C07K 2317/622* (2013.01); *C07K 2317/76* (2013.01); *C07K 2319/02* (2013.01); *C07K 2319/03* (2013.01); *C07K 2319/30* (2013.01); *C07K 2319/33* (2013.01); *C12N 2510/00* (2013.01)

(58) Field of Classification Search
None
See application file for complete search history.

(56) References Cited

U.S. PATENT DOCUMENTS

| | | | | |
|---|---|---|---|---|
| 11,345,893 | B2 * | 5/2022 | Li | .................. C12N 15/62 |
| 11,697,685 | B2 * | 7/2023 | Li | .................. C07K 14/70521 |
| | | | | 424/93.21 |
| 11,738,051 | B2 * | 8/2023 | Li | .................. A61K 40/421 |
| | | | | 424/93.71 |

FOREIGN PATENT DOCUMENTS

CN  105907719  *  8/2016  ............. C07K 16/30

OTHER PUBLICATIONS

Cartellier et al., 2010 J biomed Biotechnol; 2010:956304.*
Qiu et al. (Regulatory effect of secretory recombinant peptides (P/C-1) on the function of immune cells and its anti-tumor effects (China Journal of Microbial Immunology, vol. 26, No. 12, Dec. 2006).*

* cited by examiner

*Primary Examiner* — Sharon X Wen
(74) *Attorney, Agent, or Firm* — Flener IP & Business Law (57) ABSTRACT

The present disclosure relates to chimeric antigen receptor cells targeting ROBO1, in particular, enhanced CAR-T cells and CAR-NK cells targeting ROBO1, and preparation and application thereof. The cells can stably expressing CAR elements, while secreting extracellular domain molecules expressing PD-1 protein or mutants thereof, and thus may block PD-11PD-L1 molecular interaction. It has been found through animal experiments that the cells have very good anti-tumor effects, and the above-mentioned cells can significantly reduce tumor recurrence and improve the survival rate compared with the conventional ROBO1-targeted CAR modified cells.

13 Claims, 4 Drawing Sheets
Specification includes a Sequence Listing.

```
                        SEQUENCE LISTING

Sequence total quantity: 13
SEQ ID NO: 1            moltype = DNA  length = 525
FEATURE                 Location/Qualifiers
source                  1..525
                        mol_type = genomic DNA
                        note = the nucleotide encoding extracellular domain or the
                         mutant of the PD-1 protein
                        organism = unidentified
SEQUENCE: 1
atggagaccg acaccctgct cctgtgggtg ctgctgctgt gggtgcctgg cagcacagga   60
ggaggcggag gttctcctgg ctggttcctg gacagccccg ataggccctg gaatcccccc  120
acctttagcc ctgccctgct ggtggtgaca gagggcgaca acgccacctt cacctgctcc  180
ttcagcaaca cctccgagag cttcacgtg gtgtggcaca gggagtcccc tagcggacag  240
accgataccc tggccgcctt ccctgaggac agaagccagc ccggccagga ctgtaggttc  300
agagtgacac agctgcccaa cggcagggac ttccacatga gcgtggtgag ggccaggagg  360
aacgactccg gcacctacgt gtgcggcgtg atcagcctgg cccccaagat ccagatcaag  420
gagagcctga gagccgagct gagggtgacc gagaggagag ccgaagtgcc caccgcccat  480
cctagcccta gccccagacc tgccggccag ttccagaccc tggtg              525

SEQ ID NO: 2            moltype = DNA  length = 708
FEATURE                 Location/Qualifiers
source                  1..708
                        mol_type = other DNA
                        note = the nucleotide encoding antigen-binding domain
                         anti-ROBO1-FN3scFv
                        organism = unidentified
SEQUENCE: 2
atccagatga cacagactac atcctccctg tctgcctctc tgggagacag agtcaccatc   60
agttgcaggg caagtcagga cattagcaat tttttaaact ggtatcagca gaaaccagat  120
ggaactgtta aactcctgat ctactacaca tcaagattac attctggagt cccatcaagg  180
ttcagtggca gtgggtctgg aacagatttt tctctcacca ttagcaaact ggagcaagaa  240
gatattgcca cttacttttg ccaacagggt aatacgcttc cacttacgtt cggcgctggg  300
acaaagttgg aacttaaagg tggtggtggt tctggcggcg gcggctccgg aggaggagga  360
tcgctgcaac agtctggacc tgagttggtg aagcctgggg cttcagtgaa gatttcctgc  420
aaggcttctg gatacacatt cactgactac tacatgaatt gggtgaagct tagccatgga  480
aagagccttg agtggattgg agatattgtt cctaacaatg gtgatactac ttacaaccag  540
aatttcagag gcaaggccac attgactgta gacaagtcct ccagcacagc ctacatggag  600
ctccgcagcc tgacatctga ggactctgca gtctattact gtgcaagatt cagtaattac  660
gtttaccctt ttgactactg gggccaaggc accactatca cagtctcc            708

SEQ ID NO: 3            moltype = DNA  length = 521
FEATURE                 Location/Qualifiers
source                  1..521
                        mol_type = other DNA
                        note = the IRES nucleotide
                        organism = unidentified
```

```
SEQUENCE: 3
ggccggtgtg cgtttgtcta tatgttattt tccaccatat tgccgtcttt tggcaatgtg    60
agggcccgga aacctggccc tgtcttcttg acgagcattc ctaggggtct ttcccctctc   120
gccaaaggaa tgcaaggtct gttgaatgtc gtgaaggaag cagttcctct ggaagcttct   180
tgaagacaaa caacgtctgt agcgacccTt tgcaggcagc ggaaccccce acctggcgac   240
aggtgcctct gcggccaaaa gccacgtgta taagatacac ctgcaaaggc ggcacaaccc   300
cagtgccacg ttgtgagttg gatagttgtg gaaagagtca aatggctcac ctcaagcgta   360
ttcaacaagg ggctgaagga tgcccagaag gtacccattt gtatgggatc tgatctgggg   420
cctcggtgca catgctttac atgtgtttag tcgaggttaa aaaacgtcta ggcccccccga   480
accacgggga cgtggttttc cttttgaaaaaa cacgatgata a                    521

SEQ ID NO: 4           moltype = DNA  length = 72
FEATURE                Location/Qualifiers
source                 1..72
                       mol_type = other DNA
                       note = the nucleotide encoding CD8 transmembrane domain
                       organism = unidentified
SEQUENCE: 4
atctacatct gggcgccctt ggccgggact tgtggggtcc ttctcctgtc actggttatc    60
accctttact gc                                                        72

SEQ ID NO: 5           moltype = DNA  length = 126
FEATURE                Location/Qualifiers
source                 1..126
                       mol_type = other DNA
                       note = the nucleotide encoding 4-1BB intracellular domain
                       organism = unidentified
SEQUENCE: 5
aaacggggca gaaagaaact cctgtatata ttcaaacaac catttatgag accagtacaa    60
actactcaag aggaagatgg ctgtagctgc cgatttccag aagaagaaga aggaggatgt   120
gaactg                                                              126

SEQ ID NO: 6           moltype = DNA  length = 336
FEATURE                Location/Qualifiers
source                 1..336
                       mol_type = other DNA
                       note = the nucleotide encoding intracellular domain
                       organism = unidentified
SEQUENCE: 6
agagtgaagt tcagcaggag cgcagacgcc cccgcgtacc agcagggcca gaaccagctc    60
tataacgagc tcaatctagg acgaagagag gagtacgatg ttttggacaa gagacgtggc   120
cgggaccctg agatgggggg aaagccgaga aggaagaacc ctcaggaagg cctgtacaat   180
gaactgcaga agataagat ggcggaggcc tacagtgaa aggcgagcgc                240
cggaggggca aggggcacga tggcctttac caggtctca gtacagccac caaggacacc   300
tacgacgccc ttcacatgca ggccctgccc cctcgc                             336

SEQ ID NO: 7           moltype = DNA  length = 2545
FEATURE                Location/Qualifiers
source                 1..2545
                       mol_type = other DNA
                       note = the nucleotide encoding anti-ROBO1-FN3 scFv-CD8
                         transmembrane-4-1BB-CD3-IRES-PD-1 protein extracellular
                         domain or mutant thereof
                       organism = unidentified
SEQUENCE: 7
atggccctgc ctgtgacagc cctgctgctg cctctggctc tgctgctgca tgccgctaga    60
cccatccaga tgacacagac tacatcctcc ctgtctgcct ctctgggaga cagagtcacc   120
atcagttgca gggcaagtca ggacattagc aatttttttaa actggtatca gcagaaacca   180
gatggaactg ttaaactcct gatctactac acatcaagat tacattctgg agtcccatca   240
aggttcagtg gcagtgggtc tggaacagat ttttctctca ccattagcaa actggagcaa   300
gaagatattg ccacttactt ttgccaacag ggtaatacgc ttccacttac gttcggcgct   360
gggacaaagt tggaacttaa aggtggtggt ggttctggcg gcggcggctc cggaggagga   420
ggatcgctgc aacagtctgg acctgagttg gtgaagcctg ggcttcagt gaagatttcc   480
tgcaaggctt ctggatacac attcactgac tactacatga gttgggtgaa gcttagcgat   540
ggaaagagcc ttgagtggat tggagatatt gttcctaaca atggtgatac tacttacaac   600
cagaatttca gaggcaaggc cacattgact gtagacaagt cctccagcac agcctacatg   660
gagctccgca gcctgacatc tgaggactct gcagtctatt actgtgcaag attcagtaat   720
tacgtttacc cttttgacta ctggggccaa ggcaccacca tcagtctc caccacgacg   780
ccagcgccgc gaccaccaac accggcgccc accatcgcgc cgcagcccct gtcctgcgc   840
ccagaggcgt gccggccagc ggcggggggc gcagtgcaca cgagggggct ggacttcgcc   900
tgtgatatct acatctgggc gccccttggcc gggacttgtg ggtccttct cctgtcactg   960
gttatcaccc tttactgcaa acggggcaga agaaactcc tgtatatatt caaacaacca  1020
tttatgagac cagtacaaac tactcaagag gaagatggct gtagctgccg atttccagaa  1080
gaagaagaag gaggatgtga actgagagtg aagttcagca ggagcgcaga cgcccccgcg  1140
taccagcagg gccagaacca gctctataac gagctcaatc taggacgaag agaggagtac  1200
gatgttttgg acaagagacg tggccgggac cctgagatgg ggggaaagcc gagaaggaag  1260
aaccctcagg aaggcctgta caatgaactg cagaaagata gatggcgga ggcctacagt  1320
gagattggga tgaaaggcga gcgccggagg gcaaggggca cgatggcct ttaccaggtc  1380
ctcagtacag ccaccaagga cacctacgac gcccttcaca tgcaggccct gccccctcgc  1440
```

```
taagcccctc tccctcccccc ccccctaacg ttactggccg aagccgcttg gaataaggcc    1500
ggtgtgcgtt tgtctatatg ttattttcca ccatattgcc gtcttttggc aatgtgaggg    1560
cccggaaacc tggccctgtc ttcttgacga gcattcctag gggtctttcc cctctcgcca    1620
aaggaatgca aggtctgttg aatgtcgtga aggaagcagt tcctctggaa gcttcttgaa    1680
gacaaacaac gtctgtagcg acccctttgca ggcagcggca cccccacct ggcgacaggt    1740
gcctctgcgg ccaaaagcca cgtgtataag atacacctgc aaaggcggca caaccccagt    1800
gccacgttgt gagttggata gttgtggaaa gagtcaaatg gctcacctca agcgtattca    1860
acaagggggct gaaggatgcc cagaaggtac cccattgtat gggatctgat ctggggcctc    1920
ggtgcacatg ctttacatgt gtttagtcga ggttaaaaaa cgtctaggcc ccccgaaacca   1980
cggggacgtg gttttccttt gaaaaacacg atgataaatg gagaccgaca ccctgctcct    2040
gtgggtgctg ctgctgtggg tgcctggcag cacaggagga ggcggaggtt ctcctggctg    2100
gttcctggac agcccgata ggccctggaa tccccccacc tttagccctg ccctgctggt    2160
ggtgacagag ggcgacaacg ccaccttcac ctgctccttc agcaacacct ccgagagctt    2220
tcacgtggtg tggcacaggg agtccctag cggacagacc gatacctgg ccgccttccc    2280
tgaggacaga agccagcccg gccaggacta ggttcaga gtgacacagc tgcccaacgg    2340
cagggacttc cacatgagcg tggtgagggc caggaggaac gactccggca cctacgtgtg    2400
cggcgtgatc agcctggccc ccaagatcca gatcaaggag agcctgagag ccgagctgag    2460
ggtgaccgag aggagagccg aagtgcccac cgccatcct agcccctagcc ccagacctgc    2520
cggccagttc cagaccctgg tgtaa                                          2545

SEQ ID NO: 8              moltype = AA  length = 175
FEATURE                   Location/Qualifiers
source                    1..175
                          mol_type = protein
                          note = the extracellular domain of the PD-1 protein or the
                          mutant thereof
                          organism = unidentified
SEQUENCE: 8
METDTLLLWV LLLWVPGSTG GGGGSPGWFL DSPDRPWNPP TFSPALLVVT EGDNATFTCS     60
FSNTSESFHV VWHRESPSGQ TDTLAAFPED RSQPGQDCRF RVTQLPNGRD FHMSVVRARR   120
NDSGTYVCGV ISLAPKIQIK ESLRAELRVT ERRAEVPTAH PSPSPRPAGQ FQTLV         175

SEQ ID NO: 9              moltype = AA  length = 236
FEATURE                   Location/Qualifiers
source                    1..236
                          mol_type = protein
                          note = the amino acid sequence of anti-ROBO1-FN3scFv
                          organism = unidentified
SEQUENCE: 9
IQMTQTTSSL SASLGDRVTI SCRASQDISN FLNWYQQKPD GTVKLLIYYT SRLHSGVPSR     60
FSGSGSGTDF SLTISKLEQE DIATYFCQQG NTLPLTFGAG TKLELKGGGG SGGGGSGGGG   120
SLQQSGPELV KPGASVKISC KASGYTFTDY YMNWVKLSHG KSLEWIGDIV PNNGDTTYNQ   180
NFRGKATLTV DKSSSTAYME LRSLTSEDSA VYYCARFSNY VYPFDYWGQG TTITVS       236

SEQ ID NO: 10             moltype = AA  length = 24
FEATURE                   Location/Qualifiers
source                    1..24
                          mol_type = protein
                          note = the sequence of CD8 transmembrane domain
                          organism = unidentified
SEQUENCE: 10
IYIWAPLAGT CGVLLLSLVI TLYC                                            24

SEQ ID NO: 11             moltype = AA  length = 42
FEATURE                   Location/Qualifiers
source                    1..42
                          mol_type = protein
                          note = the sequence of 4-1BB intracellular domain
                          organism = unidentified
SEQUENCE: 11
KRGRKKLLYI FKQPFMRPVQ TTQEEDGCSC RFPEEEEGGC EL                         42

SEQ ID NO: 12             moltype = AA  length = 112
FEATURE                   Location/Qualifiers
source                    1..112
                          mol_type = protein
                          note = the sequence of intracellular domain
                          organism = unidentified
SEQUENCE: 12
RVKFSRSADA PAYKQGQNQL YNELNLGRRE EYDVLDKRRG RDPEMGGKPR RKNPQEGLYN     60
ELQKDKMAEA YSEIGMKGER RRGKGHDGLY QGLSTATKDT YDALHMQALP PR            112

SEQ ID NO: 13             moltype = DNA  length = 1440
FEATURE                   Location/Qualifiers
source                    1..1440
                          mol_type = other DNA
                          note = the sequence of anti-ROBO1-FN3 scFv-CD8
                          transmembrane-4-1BB-CD3
                          organism = unidentified
```

```
SEQUENCE: 13
atggccctgc ctgtgacagc cctgctgctg cctctggctc tgctgctgca tgccgctaga  60
cccatccaga tgacacagac tacatcctcc ctgtctgcct ctctgggaga cagagtcacc  120
atcagttgca gggcaagtca ggacattagc aattttttaa actggtatca gcagaaacca  180
gatggaactg ttaaactcct gatctactac acatcaagat tacattctgg agtcccatca  240
aggttcagtg gcagtgggtc tggaacagat ttttctctca ccattagcaa actggagcaa  300
gaagatattg ccacttactt ttgccaacag ggtaatacgc ttccacttac gttcggcgct  360
gggacaaagt tggaacttaa aggtggtggt ggttctggcg gcggcggctc cggaggagga  420
ggatcgctgc aacagtctgg acctgagttg gtgaagcctg gggcttcagt gaagatttcc  480
tgcaaggctt ctggatacac attcactgac tactacatga attgggtgaa gcttagccat  540
ggaaagagcc ttgagtggat tggagatatt gttcctaaca atggtgatac tacttacaac  600
cagaatttca gaggcaaggc cacattgact gtagacaagt cctccagcac agcctacatg  660
gagctccgca gcctgacatc tgaggactct gcagtctatt actgtgcaag attcagtaat  720
tacgtttacc cttttgacta ctggggccaa ggcaccacta tcacagtctc caccacgacg  780
ccagcgccgc gaccaccaac accggcgccc accatcgcgt cgcagcccct gtccctgcgc  840
ccagaggcgt gccggccagc ggcgggggggc gcagtgcaca cgaggggggct ggacttcgcc  900
tgtgatatct acatctgggc gcccttggcc gggacttgtg gggtccttct cctgtcactg  960
gttatcaccc tttactgcaa acggggcaga aagaaactcc tgtatatatt caaacaacca  1020
tttatgagac cagtacaaac tactcaagag gaagatggct gtagctgccg atttccagaa  1080
gaagaagaag gaggatgtga actgagagtg aagttcagca ggagcgcaga cgccccgcg  1140
taccagcagg gccagaacca gctctataac gagctcaatc taggacgaag agaggagtac  1200
gatgttttgg acaagagacg tggccggac cctgagatgg ggggaaagcc gagaaggaag  1260
aaccctcagg aaggcctgta caatgaactg cagaaagata agatggcgga ggcctacagt  1320
gagattggga tgaaaggcga gcgccggagg ggcaaggggc acgatggcct ttaccagggt  1380
ctcagtacag ccaccaagga cacctacgac gcccttcaca tgcaggccct gccccctcgc  1440
```

CHIMERIC ANTIGEN RECEPTOR CELLS TARGETING ROBO1, PREPARATION METHOD AND USE THEREOF

CROSS-REFERENCE TO RELATED APPLICATIONS

This application is a continuation of U.S. application Ser. No. 16/700,401, filed on Dec. 2, 2019, which is a continuation application of International patent application No. PCT/CN2017/089517, filed on Jun. 22, 2017. The International Application claims priority to Chinese patent application No. CN201710407619.8, filed on Jun. 2, 2017. All of the aforementioned applications are hereby incorporated by reference herein in their entireties.

REFERENCE TO AN ELECTRONIC SEQUENCE LISTING

The contents of the electronic sequence listing (CU740SequenceListing.xml; Size: 21,740 bytes; and Date of Creation: May 18, 2023) is herein incorporated by reference in its entirety.

TECHNICAL FIELD

The disclosure relates to the technical field of biotechnology, and in particular relates to a chimeric antigen receptor cell targeting ROBO1, especially, a ROBO1-targeted reinforced CAR-T cell and CAR-NK cell, and preparation method and use thereof.

BACKGROUND

Chimeric antigen receptor modified T cells (CAR-T) immunotherapy is an adoptive immunotherapy rapidly developed in recent years, wherein the CAR is usually comprises of an antigen-binding domain, a transmembrane domain, a costimulatory signaling region and the like, and gene modification technology is adopted, the antibody capable of recognizing the tumor-related antigens is fused and expressed on the surface of the autologous T cells, therefore, the modified T cells have targeted killing effects on tumor cells. The CAR-T therapy has remarkable therapeutic effect on acute leukemia and non-Hodgkin's lymphoma, and is considered to be one of the most promising tumor treatments. In addition to blood system tumors, researchers continue working to extend CAR-T treatment to solid tumors, but no expected therapeutic effect has been obtained when the CAR-T is used for treating solid tumors (which are composed of heterogeneous cell populations, the heterogeneous cells having different surface molecules), and an ideal treatment effect is not obtained.

PD-L1 is short for programmed death receptor-Ligand 1, also referred as programmed cell death-Ligand1, and is the first type transmembrane protein with 40 k Da in size. PD-1 is short for programmed death receptor 1, also referred as programmed death 1, and is an important immunosuppression molecule, it is a member of CD28 superfamily. PD-1 is mainly expressed on the surface of T cells and primary B cells, the two ligands of PD-1 (PD-L1 and PD-L2) are widely expressed in antigen presenting cell (APC) and the like. The interaction between PD-1 and the ligands thereof plays an important role in the aspect of negative regulation of immune responses. The expression of PD-L1 protein can be detected in many human tumor tissues, and the microenvironment at the tumor site can induce expression of PD-L1 on tumor cells. The expressed PD-L1 facilitates the occurrence and growth of tumors, induces the apoptosis of the anti-tumor T cells to escape the attack of immune system. The inhibition of the binding of PD-1 to the ligands can expose the tumor cells to the killing power of immune system, so that the effects of killing tumor tissues and treating cancers can be achieved.

At the 2016 AACR® (American Association for Cancer Research) annual conference, it is reported by the Professor of dermatology Paul T. Nghiem, MD, PhD, School of Medicine, University of Washington that pembrolizumab, a monoclonal antibody with the anti-PD-1 effect, can induce high-reactivity of advanced Merkelcell carcinoma, its median progression-free survival (PFS) is 9 months, while the PFS of traditional chemotherapy is three months. Recently, a new progress has been made for a PD-1 inhibitor OPDIVO® by Bristol-Myers™ in the aspect of clinical tests, and two sets of data are issued, wherein one set of data shows that patients with advanced melanoma who have no treatment response to any current drug have achieved a 34% five-year survival rate with OPDIVO®. It should be noted that the five-year survival rate of the IV-stage melanoma patients is usually only 15% to 20%. The other set of data show that the combination use of OPDIVO® and YERVOY® can achieve 22% overall response rate, and 69% overall two-year survival rate in patients with advanced melanoma. It show in another study that the survival time and survival rate of patients who suffered from refractory relapsed or metastatic head and neck squamous cell carcinoma (SCCHN) are greatly improved after treatment by OPDIVO®. The data show that compared with a control group, the death risk of the OPDIVO® treatment group is remarkably reduced by 30%, and the median over all survival time is remarkably prolonged. The one-year survival rate of the OPDIVO® treatment group is 36%, while the control group is 16.6%. In addition, the therapeutic effect of the OPDIVO® vs the control scheme is evaluated in terms of the status of the mouth-throat tumor HPV and the expression status of the PD-L1 in the study. Recently, KENTRUDA® has been approved by FDA® (Food and Drug Administration) as a breakthrough drug for the treatment of relapsed or refractory (R/R) typical Hodgkin's lymphoma (cHL).

The patent application CN1055058669A discloses chimeric receptor T cells for tumor stem cells. The T cells are embedded with 2-3 independent antigen receptors, and each chimeric antigen receptor is formed by antigen-binding sites of antibody against specific marker to different tumor stem cells and different functional proteins, respectively. The chimeric receptor T cells can only activate anti-tumor effects of T cell after the antigen is recognized by the said 2-3 chimeric antigen receptors. The method has improved the specificity to a certain extent, but is less specific for tumor cells with hidden antigens.

It is reported in a literature by Liza B. John (Blockade of PD-1 immunosuppression boosts CAR-T-cell therapy) that the PD-1 immunosuppression pathway, namely the binding of PD-1 to ligand PD-L, is hindered by the addition of an anti-PD-1 antibody, thereby, the anti-tumor effect of the genetically modified chimeric antigen-expressing receptor T cells (CAR-T) is improved to a certain extent.

SUMMARY

In order to overcome the defects in the prior art, the disclosure provides a chimeric antigen receptor cell targeting ROBO1, and particularly a ROBO1-targeted reinforced CAR-T cell and a CAR-NK cell, and preparation method and use thereof.

A study finds that Robo1 is over-expressed in a variety of cancers, such as hepatocellular carcinoma, breast cancer, colon cancer, pancreatic cancer, prostate cancer, neuroglioma and the like, while it is expressed at low level in normal tissues. Thus it can be used as a new tumor-related antigen and is a potential treatment and diagnosis target.

In the first aspect of the present disclosure, it provides a encoding nucleotide comprising a nucleotide encoding chimeric antigen receptor and a nucleotide encoding extracellular secretory protein, wherein the chimeric antigen receptor comprises an antigen-binding domain, a transmembrane domain and a costimulatory signaling region, and the antigen-binding domain is capable of specifically binding tumor specific antigen ROBO1, and activating immune cells (such as T cells, B cells or natural killer cells) through the transmembrane domain and the costimulatory signaling region; the extracellular secretory protein is capable of preventing or inhibiting the binding of the wild type PD-1 protein to the PD-L1 ligand.

Preferably, the nucleotide encoding chimeric antigen receptor and the nucleotide encoding extracellular secretory protein are not in the same reading frame.

In one embodiment of the present disclosure, the extracellular secretory protein is PD-1 fragment binding to PD-L1 and/or PD-L2.

In a preferred embodiment of the present disclosure, the extracellular secretory protein is an extracellular domain or a mutant sequence of the PD-1 protein, wherein the mutant of the extracellular domain is capable of binding PD-L1 with high affinity. preferably, the extracellular domain or the mutant of the PD-1 protein has an amino acid sequence as shown in SEQ ID NO: 8.

In a preferred embodiment of the disclosure, the nucleotide encoding extracellular domain or the mutant of the PD-1 protein has a sequence as shown in SEQ ID NO: 1. The extracellular region of the Robo1 comprises five immunoglobulin conserved regions (designated as IG 1-5 respectively)) and three FibronectinIII type repetitive sequences (designated as FNIIII 1-3, or FN1-3 for short), and the intracellular region comprises four conserved regions (designated as CC0, CC1, CC2 and CC3 respectively). The antigen-binding domain can specifically bind to one or more of the IG1, IG2, IG3, IG4, IG5, FN1, FN2 and FN3 domains of the tumor specific antigen ROBO1.

In one embodiment of the present disclosure, in the encoding nucleotide, the antigen-binding domain is capable of specifically binding to the FN3 domain of the tumor specific antigen ROBO1 (hereinafter referred to as ROBO1-FN3 for short).

In one embodiment of the disclosure, in the encoding nucleotide, the antigen-binding domain is an antibody or an antigen-binding fragment thereof; preferably, the antigen-binding domain is an antibody or antigen-binding fragment there of specifically binding to FN3 domain of ROBO1.

In one embodiment of the disclosure, in the encoding nucleotide, the antigen-binding fragment is Fab or scFv.

In one embodiment of the disclosure, in the encoding nucleotide, the antigen-binding domain is an anti-ROBO1-FN3scFv. Preferably, the anti-ROBO1-FN3 scFv has an amino acid sequence as shown in SEQ ID NO: 9.

In a preferred embodiment of the disclosure, in the encoding nucleotide, the antigen-binding domain is an anti-ROBO1-FN3scFv, the nucleotide encoding antigen-binding domain has a sequence as shown in SEQ ID NO: 2.

In one embodiment of the disclosure, the encoding nucleotide further comprises internal ribosome entry site IRES nucleotide, and the IRES nucleotide is located between the nucleotide encoding chimeric antigen receptor and the nucleotide of the encoding extracellular secretory protein; preferably, the IRES nucleotide has a sequence as shown in SEQ ID NO: 3.

In one embodiment of the present disclosure, the encoding nucleotide comprises a nucleotide encoding extracellular domain of the IRES-PD-1 protein or the mutant thereof.

In one embodiment of the present disclosure, in the encoding nucleotide, the transmembrane domain is selected from one or more transmembrane domains of CD28, CD3ε, CD45, CD4, CD5, CD8, CD9, CD16, CD22, CD33, CD37, CD134, CD137, ICOS and CD154.

In one preferred embodiment of the disclosure, in the encoding nucleotide, the transmembrane domain is a CD8 transmembrane domain.

In one embodiment of the disclosure, the CD8 transmembrane domain has a sequence as shown in SEQ ID NO: 10.

In a preferred embodiment of the disclosure, the nucleotide encoding CD8 transmembrane domain has a sequence as shown in SEQ ID NO: 4.

In one embodiment of the present disclosure, the costimulatory signaling region comprises intracellular domains of costimulatory molecules, preferably, the costimulatory molecule is selected from one or more of CD3ζ, CD3γ, CD3δ, CD3ε, CD5, CD22, CD79a, CD79b, CD66d, CD2, CD4, CD5, CD28, CD134, CD137, ICOS, CD154, 4-1BB and OX40.

In one preferred embodiment of the disclosure, in the encoding nucleotide, the costimulatory signaling region comprises 4-1BB and CD3ζ intracellular domains.

In one embodiment of the disclosure, the 4-1BB intracellular domain has a sequence as shown in SEQ ID NO: 11.

In another embodiment of the present disclosure, the CD3ζ intracellular domain has a sequence as shown in SEQ ID NO: 12.

In one embodiment of the disclosure, the nucleotide encoding 4-1BB intracellular domain has a sequence as shown in SEQ ID NO: 5.

In another embodiment of the disclosure, the nucleotide encoding CD3ζ intracellular domain has a sequence as shown in SEQ ID NO: 6.

In a preferred embodiment of the disclosure, the encoding nucleotide comprises the nucleotide encoding CD8 transmembrane domain, 4-1BB and CD3ζ intracellular domains.

In a more preferred embodiment of the disclosure, the encoding nucleotide comprises a nucleotide encoding CD8 transmembrane-4-1BB-CD3ζ.

In a further preferred embodiment of the disclosure, the encoding nucleotide comprises a nucleotide encoding anti-ROBO1-FN3 scFv-CD8 transmembrane-4-1BB-CD3ζ, preferably, the nucleotide encoding anti-ROBO1-FN3 scFv-CD8 transmembrane-4-1BB-CD3ζ has a sequence as shown in SEQ ID NO: 13.

In one embodiment of the disclosure, the encoding polynucleotide is isolated and/or synthesized.

In a preferred embodiment of the disclosure, the encoding nucleotide comprises a nucleotide encoding anti-ROBO1-FN3 scFv-CD8 transmembrane-4-1BB-CD3ζ-IRES-(PD-1 protein extracellular domain or mutant thereof), preferably, the nucleotide encoding anti-ROBO1-FN3 scFv-CD8 transmembrane-4-1BB-CD3ζ-IRES-(PD-1 protein extracellular domain or mutant thereof), has a sequence as shown in SEQ ID NO: 7.

In the second aspect of the disclosure, it provides a vector containing the encoding nucleotide described in the disclosure.

In one embodiment of the disclosure, the vector is selected from one or more of plasmids, bacteria, viruses and the like.

In one embodiment of the present disclosure, as for the vector, a virus vector which lacks replication capability and cannot be self-replicated in transfected cells can be used, such as reverse transcription virus vectors (including oncogenic retroviral vectors, lentivirus vectors and pseudo type vectors), adenovirus vectors, vaccinia virus vectors or HSV vectors and the like.

In one preferred embodiment of the disclosure, the vector is a lentivirus vector.

In a more preferred embodiment of the present disclosure, the lentiviral vector is a PRRSLIN vector.

In one embodiment of the disclosure, the vector further comprises a promoter.

In a preferred embodiment of the disclosure, the promoter is EF-1α promoter.

In the third aspect of the disclosure, it provides chimeric antigen receptor cells (CAR-cells), which expresses an extracellular secretory protein, wherein the extracellular secretory protein can prevent or inhibit the binding of the wild type PD-1 protein to the PD-L1 ligand.

In one embodiment of the present disclosure, in the CAR-cell, the extracellular secretory protein is PD-1 protein fragment binding to PD-L1 and/or PD-L2.

In a preferred embodiment of the present disclosure, in the CAR-cell, the extracellular secretory protein is an extracellular domain of the PD-1 protein or a mutant sequence thereof; preferably, the extracellular domain of the PD-1 protein or the mutant thereof has an amino acid sequence as shown in SEQ ID NO: 8.

In a preferred embodiment of the disclosure, in the CAR-cells, the nucleotide encoding extracellular domain of the PD-1 protein or the mutant thereof has a sequence as shown in SEQ ID NO: 1.

Preferably, the CAR-cell further expresses a chimeric antigen receptor, wherein the chimeric antigen receptor comprises an antigen-binding domain, a transmembrane domain, and a costimulatory signaling region, the antigen-binding domain can specifically bind the tumor specific antigen ROBO1, and activate the CAR-cells (e.g. CAR-T cells, B cells or natural killer cells) through the transmembrane domain and the costimulatory signaling region.

In one embodiment of the present disclosure, in the CAR-cells, the antigen-binding domain can specifically bind to one or more of the Ig1, Ig2, Ig3, Ig4, Ig5, FN1, FN2 and FN3 domains of the tumor specific antigen ROBO1.

In one embodiment of the disclosure, in the CAR-cells, the antigen-binding domain in the CAR-cell can specifically bind to the tumor specific antigen ROBO1-FN3.

In one embodiment of the disclosure, in the CAR-cells, the antigen-binding domain is an antibody or antigen-binding fragment thereof. Preferably, the antigen-binding domain is an antibody or antigen-binding fragment there of specifically binding to FN3 domain of ROBO1.

In one embodiment of the disclosure, in the CAR-cell, the antigen-binding fragment is Fab or scFv.

In one embodiment of the disclosure, in the CAR-cell, the antigen-binding domain is anti-ROBO1-FN3scFv; preferably, the anti-ROBO1-FN3scFv has an amino acid sequence as shown in SEQ ID NO: 9; more preferably, the nucleotide encoding antigen-binding domain has a sequence as shown in SEQ ID NO: 2.

In one embodiment of the present disclosure, in the CAR-cells, internal ribosome entry site IRES nucleotide is located between the nucleotide encoding chimeric antigen receptor and the nucleotide encoding extracellular secretory protein, and has a sequence as shown in SEQ ID NO: 3.

In one embodiment of the present disclosure, in the CAR-cells, the transmembrane domain is selected from one or more transmembrane domains of CD28, CD3ε, CD45, CD4, CD5, CD8, CD9, CD16, CD22, CD33, CD37, CD134, CD137, ICOS and CD154.

In one preferred embodiment of the disclosure, in the encoding nucleotide, the transmembrane domain is CD8 transmembrane (CD8 transmembrane) domain.

In one embodiment of the disclosure, the CD8 transmembrane domain has a sequence as shown in SEQ ID NO: 10.

In a preferred embodiment of the disclosure, the nucleotide encoding the CD8 transmembrane domain has a sequence as shown in SEQ ID NO: 4.

In one embodiment of the present disclosure, the costimulatory signaling region comprises intracellular domains of costimulatory molecules, preferably, the costimulatory molecule is selected from one or more of CD3ζ, CD3γ, CD3δ, CD3ε, CD5, CD22, CD79a, CD79b, CD66d, CD2, CD4, CD5, CD28, CD134, CD137, ICOS, CD154, 4-1BB and OX40.

In one preferred embodiment of the disclosure, in the encoding nucleotide, the costimulatory signaling region comprises 4-1BB and CD3ζ intracellular domains.

In one embodiment of the disclosure, the 4-1BB intracellular domain has a sequence as shown in SEQ ID NO: 11.

In another embodiment of the present disclosure, the CD3ζ intracellular domain has a sequence as shown in SEQ ID NO: 12.

In one embodiment of the disclosure, the nucleotide encoding 4-1BB intracellular domain has a sequence as shown in SEQ ID NO: 5.

In another embodiment of the present disclosure, the nucleotide encoding CD3ζ intracellular domain has a sequence as shown in SEQ ID NO: 6.

In a preferred embodiment of the disclosure, the encoding nucleotide comprises the nucleotide encoding CD8 transmembrane domain, 4-1BB and CD3ζ intracellular domains.

In a more preferred embodiment of the present disclosure, the CAR-cells comprise the nucleotide encoding CD8 transmembrane-4-1BB-CD3ζ.

In a further preferred embodiment of the disclosure, the CAR-cells comprise a nucleotide encoding anti-ROBO1-FN3 scFv-CD8 transmembrane-4-1BB-CD3ζ, preferably, the anti-ROBO1-FN3 scFv-CD8 transmembrane-4-1BB-CD3ζ has a sequence as shown in SEQ ID NO: 13.

In a preferred embodiment of the disclosure, the CAR-cells comprise a nucleotide encoding anti-ROBO1-FN3 scFv-CD8 transmembrane-4-1BB-CD3ζ-IRES-(PD-1 protein extracellular domain or mutant thereof), and preferably, the anti-ROBO1-FN3 scFv-CD8 transmembrane-4-1BB-CD3ζ-IRES-(PD-1 protein extracellular domain or mutant thereof), has a sequence as shown in SEQ ID NO: 7.

In one embodiment of the present disclosure, the CAR-cells comprise the encoding nucleotide described in the first aspect of the present disclosure.

In one embodiment of the present disclosure, the CAR-cells comprise the vector described in the second aspect of the disclosure.

In one embodiment of the disclosure, the CAR-cells are immune cells, and are selected from one or more of T cells, natural killer (NK) cells, cytotoxic T lymphoma cells and regulatory T cells.

In one embodiment of the present disclosure, the T cells are human T cells, preferably, the human is a person with cancer.

In one embodiment of the present disclosure, the NK cells are human NK cells, preferably, the human is a person with cancer; more preferably, the NK cells are NK92 cells.

In a preferred embodiment of the present disclosure, the CAR-cells are human T cells (hereinafter referred to as CAR-T cells for short).

In a preferred embodiment of the present disclosure, the CAR-cells are NK cells (hereinafter referred to as CAR-NK cells for short).

In a more preferred embodiment of the present disclosure, the CAR-NK cells are CAR-NK92 cells.

The CAR-cells described in the disclosure can be administrated alone or be administrated as a pharmaceutical composition in combination with other components such as IL-2 or other cytokines or cell populations.

In the fourth aspect of the disclosure, it provides a method for preparing the above CAR-cells, the method comprises the following steps:
  (1) cloning the encoding polynucleotide into vectors;
  (2) transfecting the vectors obtained in the step (1) into 293T cells to prepare virus;
  (3) infecting immune cells by using the virus obtained in the step (2), and making the immune cells express the chimeric antigen receptor and the extracellular domain of the extracellular secreted PD-1 protein or the mutant protein thereof to obtain CAR-cells.

In the fifth aspect of the disclosure, it provides a pharmaceutical composition comprising one or more of the encoding nucleotide, the vector and the CAR-cell of the disclosure.

In one embodiment of the present disclosure, the pharmaceutical composition comprises an effective amount of CAR-cells, preferably CAR-T cells and/or CAR-NK92 cells.

In one embodiment of the disclosure, the pharmaceutical composition further comprises pharmaceutically acceptable excipients.

In one embodiment of the disclosure, in the pharmaceutical composition, the excipients are selected from one or more of buffer solution, carbohydrates, antioxidants, chelating agents and preservatives. The pharmaceutical composition described in the present disclosure is preferably formulated for intravenous administration.

The pharmaceutical composition can be administrated in any convenient manner, including spraying, injection, oral administration, infusion, implantation or transplantation, and preferably, the pharmaceutical composition described in the present disclosure can be administrated to the patients subcutaneously, intradermally, intra-tumor, intra-knot, intra-spinal, intramuscularly, intravenously or intraperitoneally. In one embodiment of the present disclosure, the pharmaceutical composition is administered to a patient by intravenous injection (i.v.).

In the sixth aspect of the disclosure, it provides a use of one or more of the encoding nucleotides, vectors, CAR-cells and pharmaceutical compositions in preparation of a medicament for treating and/or preventing cancer.

In one embodiment of the disclosure, in the use, the cancer is tumor with high expression of ROBO1 and related diseases, the "high expression" means that the expression level of the ROBO1 in the tumor cells is higher than that in normal cells.

In one embodiment of the disclosure, the cancer is liver cancer, breast cancer, colon cancer, pancreatic cancer, prostate cancer, neuroglioma or lung cancer.

In a preferred embodiment of the disclosure, the cancer is a lung cancer.

On the basis of previous research work (as in the Chinese patent application No. CN201610237593.2), the inventors prepare a chimeric antigen receptor cell targeting ROBO1, and provide the preparation and use thereof, in particularly, enhanced CAR-T cell and a CAR-NK targeting ROBO1. The cells above can stably express CAR elements, while secret extracellular domain molecules expressing PD-1 protein or mutants thereof, which may block the interaction of PD-1/PD-L1 molecules. It has been found through animal experiments that the cells have excellent anti-tumor effects. The above cells can significantly reduce tumor recurrence rate and improve the survival rate compared with the conventional ROBO1-targeted CAR modified cells.

DETAILED DESCRIPTIONS OF THE EMBODIMENTS

Unless otherwise defined, all technical and scientific terms used in the present disclosure have the same meaning as commonly understood by one of ordinary skill in the technical field of the disclosure.

In the present disclosure, the term "antibody" refers to an immunoglobulin molecule specifically binding to an antigen. An antibody may be an intact immunoglobulin derived from natural source or recombinant source, and may be the immune response portion of intact immunoglobulin. The antibody is usually a tetramer of immunoglobulin molecules. The antibodies of the disclosure may be present in a variety of forms, including polyclonal antibodies, monoclonal antibodies, FV, Fab and F(ab)2, and a single-chain antibody and a humanized antibody, etc (Harlow et al. 1999, in: Using Antibodies: A Laboratory Manual, Cold Spring Harbor Laboratory Press, NY; Harlow et al. 1989, In: Antibodies: A Laboratory Manual, Cold Spring Harbor, New York; Houston et al. 1989, Proc. Natl. Acad. Sci. USA 85:5879-5883; Bird et al. 1988, Science 242: 423-426).

The term "antibody fragment" refers to a part of an intact antibody, and refers to an antigen-determinant variable region of an intact antibody. Examples of antibody fragments include, but are not limited to, Fab, Fab', F(ab')$_2$ and Fv fragments, a linear antibody formed from an antibody fragment, a scFv antibody and a multi-specific antibody.

The term "antigen-binding fragment" is composed of an intact light chain, a heavy chain VH and a CH1 domain, and can be specifically bind to an antigen.

The term "encoding" refers to the intrinsic properties of specific sequences of nucleotides in polynucleotides such as a gene, cDNA or mRNA used as templates for synthesis of other polymers and macromolecules, wherein the polymers and the macromolecules have any one of a defined sequence of nucleotides (i.e., rRNA, tRNA and mRNA) or an amino acid sequence and biological properties produced by them. Thus, if the transcription and translation of mRNA corresponding to a gene produce a protein in cells or other biological systems, the gene encodes the protein. The polynucleotide is equivalent to the mRNA sequence and is generally provided in a coding strand, and a non-coding strand used as a template of a transcription gene or a cDNA in a sequence listing, both of which can be referred to as encoding protein or other product for gene or cDNA.

Unless stated otherwise, "polynucleotide encoding amino acid sequence" includes all polynucleotides that are degenerate each other and encode the same amino acid sequence. polynucleotides encoding protein and RNA can include introns.

The term "costimulatory molecule" refers to an associated binding chaperone on T cells specifically binding to costimulatory ligand, thereby mediating costimulatory response of T cell, such as, but not limited to, proliferation. Costimulatory molecules include, but are not limited to, MHCI molecules, BTLA and Toll ligand receptors.

The term "lentivirus" refers to a genus of retrovirus, which can effectively infect non-periodic and post-mitotic cells; and it can deliver significant amount of genetic information to the DNA of host cell, so that it is one of the most effective methods of gene delivery vectors.

The term "promoter" is defined as DNA sequence that is necessary for start of specific transcription of polynucleotide, and can be recognized by synthesis machinery of cell, or can direct the synthesis machinery of cell.

The term "specifically binding" refers to recognizing specific antigen but not substantially recognizing or binding other molecules in samples.

The term "vector" is a composition comprising isolated nucleic acids, which can be used to deliver isolated nucleic acids into cells. Many vectors are known in the art, and including but not limited to, linear polynucleotides, polynucleotides associated with ionic or amphiphilic compounds, plasmids, and viruses. Thus, the term "vector" includes autonomously replicating plasmids or viruses. The term should also be interpreted as including non-plasmid and non-viral compound that facilitates delivering nucleic acids into cells, such as, polylysine compounds, liposomes, and the like. Examples of viral vectors include, but are not limited to, adenovirus vectors, adeno-associated virus vectors, reverse transcription virus vectors and the like.

The term "isolated" refers to changing or removing from natural state. For example, nucleic acids or peptides naturally present in living animals are not "isolated", but the same nucleic acid or peptide which is partially or completely separated from the coexisting substance of its natural state is "isolated". The isolated nucleic acid or protein may be present in substantially purified form, or, for example, may be present in non-natural environment, such as a host cell.

The term "cancer" is defined as disease characterized by the rapid and uncontrolled growth of aberrant cells. Cancer cells can spread locally or through the bloodstream and lymph system to other parts of the body. Examples of various cancers include, but are not limited to, breast cancer, prostate cancer, ovarian cancer, cervical cancer, skin cancer, pancreatic cancer, colorectal cancer, kidney cancer, liver cancer, brain cancer, lymphoma, leukemia, lung cancer and the like.

The term "anti-tumor effect" refers to biological effect, which can be manifested by reduction in tumor volume, decrease in the number of tumor cells, decrease in the number of metastases, increase of the expected life, or the improvement of various physiological symptoms associated with the cancer condition.

The terms "patient", "subject" and "individual" and the like can be used interchangeably herein, and refers to any animal or cell that follows the methods described herein, whether in vitro or in situ. In some non-limiting embodiments, patients, subjects, or individuals are human.

The "-" linkage of the amino acid sequence of the present disclosure is that the N-terminus of one fragment is directly linked to the C-terminus of the other fragment, and no linker peptide exists in the middle.

The technical solutions of the present disclosure will be clearly and completely described below with reference to the Examples of the present disclosure, the Examples described are merely a part of the embodiments of the present disclosure rather than all of the embodiments. Based on the Examples of the present disclosure, all other embodiments obtained by ordinary skilled persons in the field without inventive efforts shall fall within the protection scope of the present disclosure.

Example 1: Preparation of Lentiviral Expression Vector

According to the sequence information of PD-1 mutant molecule (HAC) reported by "Engineering high-affinity PD-1 variants for optimized immunotherapy and immune-PET imaging" (Maute R L, Gordon S R, Mayer A T, et al. Proceedings of the National Academy of Sciences, 2015, 112(47):E6506-E6514), the gene sequence of PD-1 protein extracellular domain or mutant thereof was synthesized, as shown in SEQ ID NO: 1. Based on Genebank database the following sequences were searched and synthesized: the known human anti-ROBO1-FN3scFv (hereinafter referred to as scFv for short) gene sequence, IRES inner ribosome entry site, human CD8 transmembrane region gene sequence, human 4-1BB intracellular region gene sequence, and CD3ζ intracellular region gene sequences were shown in SEQ ID NO: 2-6, respectively.

The above gene sequences were sequentially linked in the order of scFv gene, CD8 gene, human 4-1BB intracellular region gene and CD3ζ intracellular region, IRES ribosome internal ribosome entry site, and the extracellular domain of PD-1 protein or the mutant gene thereof, and different restriction enzyme sites were introduced at the linking positions of the sequences, so as to form an intact scFv-CD8 transmembrane-4-1BB-CD3ζ-IRES-(the PD-1 protein extracellular domain or mutant thereof) gene sequence as shown in SEQ ID NO: 7.

Figure 1:
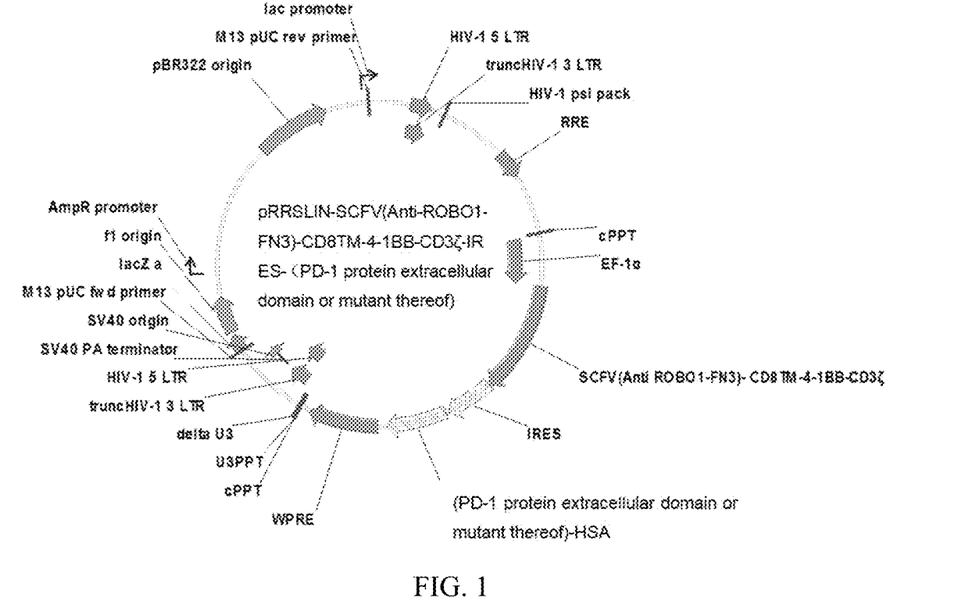
FIG. 1 illustrates a schematic construction map of a lentiviral expression vector provided in Example 1 of the present disclosure.

The scFv-CD8 transmembrane-4-1BB-CD3ζ-IRES-(the extracellular domain of the PD-1 protein or mutant thereof) gene sequence was transformed into a pRRSLIN vector by double enzyme digestion, wherein the upstream of the gene was an EF-1α promoter. After the vector was transformed into Stbl3 *Escherichia coli* strain, the strain was transferred to solid culture medium containing ampicillin to culture, and screened to obtain positive clones. Plasmids were extracted, and identified by enzyme digestion, and the vectors were successfully constructed through sequencing to obtain a pRRSLIN-scFv-CD8 transmembrane-4-1BB-CD3ζ-IRES-(PD-1 protein extracellular domain or mutant thereof) lentivirus expression vector. The construction map of the lentivirus expression vector is shown in FIG. 1.

Example 2: Preparation of Lentivirus 1. 24 Hours before transfection, 293T cells were inoculated into a 15 cm culture dish at a cell density of about 8×106 cells per dish. It was ensured that the cells were at a confluence degree of about 80%, and evenly distributed in the culture dish at the time of the transfection.
2. Preparation of solution A and solution B
Solution A: 6.25 mL 2×HEPES buffer solution (the amount of 5 large vessels for packaging was used for the best effect).
Solution B: A mixture with the following plasmids respectively added: 112.5 μg scFv-CD8 transmembrane-4-1BB-CD3ζ-IRES-(the PD-1 protein extracellular domain or mutant thereof) (target plasmid), 39.5 μg pMD2.G (VSV-G envelop), 73 μg pCMVR8.74 (gag, pol, tat, rev), 625 μL 2M calcium ion solution. The total volume of solution B was 6.25 ml.
3. The solution B was thoroughly mixed, and the solution B was added dropwise to Solution A while the solution A was lightly vortexed, and allowed to stand for 5-15 minutes. The mixed solution of A and B was lightly vortexed, and added dropwise to a culture dish containing 293T cells. The culture dish was slightly shaken back and forth to evenly distribute the mixture of DNA and calcium ions (without rotating the culture dish). The culture dish was placed in an incubator and cultured for 16-18 hours.

The medium was replaced with new fresh culture medium and continued to culture.

It was centrifuged at a rotating speed of 500 g, and temperature of 25° C. for 10 min, and filtered by a PES film (0.45 μm)). A centrifuge tube (Beckmann ultra-clear SW28 centrifuge tube) was sterilized with 70% ethanol, and then disinfected under an ultraviolet lamp for 30 min. The filtered supernatant containing the lentivirus was transferred into the centrifugal tube, and a layer of 20% sucrose (1 mL sucrose/8 mL supernatant was added) was cautiously laid at the bottom of the centrifuge tube, and the centrifuge tube was equilibrated with PBS, and centrifuged at a speed of 25,000 rpm (82, 700 g) for 2 h at 4° C. The centrifuge tube was cautiously taken out, and the supernatant was discarded, and the centrifuge tube was inverted to remove the residual liquid. The centrifugal tube was added 100 μl PBS, sealed, placed at 4° C. for 2 hours with a gentle vortex every 20 minutes, and centrifuged at 500 g for 1 min (25° C.), the lentivirus-containing supernatant was collected, cooled on ice, and then stored at −80° C.

Example 3: Preparation of CAR-T Cells

CAR-T cells were prepared according to the steps of CN20161022230.9 example 3.

Figure 2:
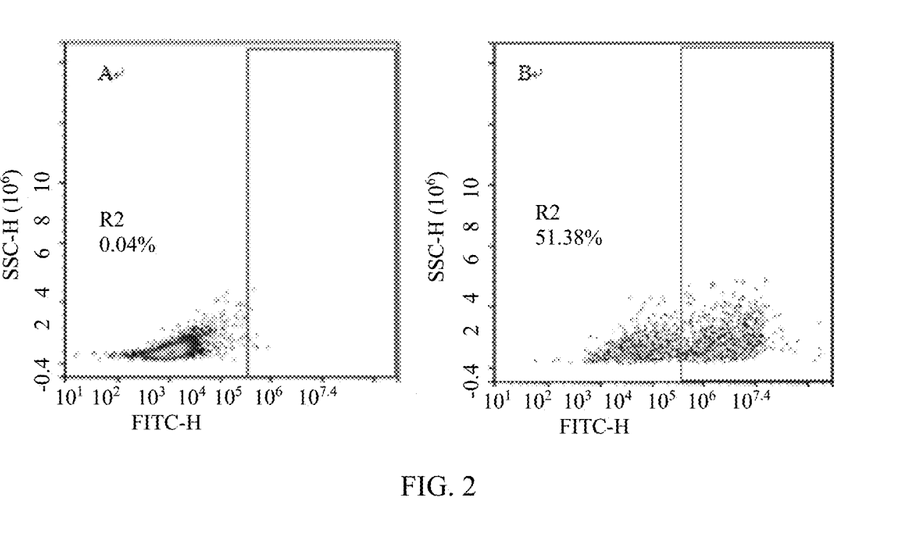
FIG. 2 illustrates a flow cytometry result of CAR-T provided in Example 3 of the present disclosure, wherein A of FIG. 2 illustrates T cells without virus infection, and serve as a control; B of FIG. 2 illustrates virus-infected T cells.

CAR-T positive rate was detected by flow cytometry after virus infection, and the flow cytometry detection result is shown in FIG. 2. The result showed that the positive rate was 51.38%, indicating that the CAR-T cells were successfully prepared. (FIG. 2: the detection of CAR-T positive expression rate by flow cytometry, A of FIG. 2 illustrates T cells without virus infection, and served as a control, and B of FIG. 2 illustrates virus-infected T cells. The antibody was labeled with FITC fluorescent and was represented on the abscissa. If the T cells successfully expressed the CAR molecules, the signal value would significantly increase).

Example 4: Preparation of CAR-NK92 Stable Cell Strain

The density of NK92 cells was adjusted to 2-3×105/ml. The virus was added to the NK92 cells in the volume ratio (V/V) of virus:cell medium=1:5-10, and the 8 μg/mL polybrene was added at the same time. After 4 hours, the density of the cells was adjusted to 1×105/mL by supplementally adding equal amount of fresh complete culture medium (The complete culture medium formulation can be found in the instructions of ATCC) for further culture. On the next day, all the cells were centrifuged, fresh culture medium was added to continue to culture. The solution was supplemented every 1-2 days, so that the cell density was maintained at 2-3×105/ml. After 72 hours, CAR antibody staining was carried out; and CAR-NK-92 positive cells were sorted by flow cytometry for culture expansion. The color change, cell density, and cell morphology of the culture medium were observed and recorded accordingly.

Figure 3:
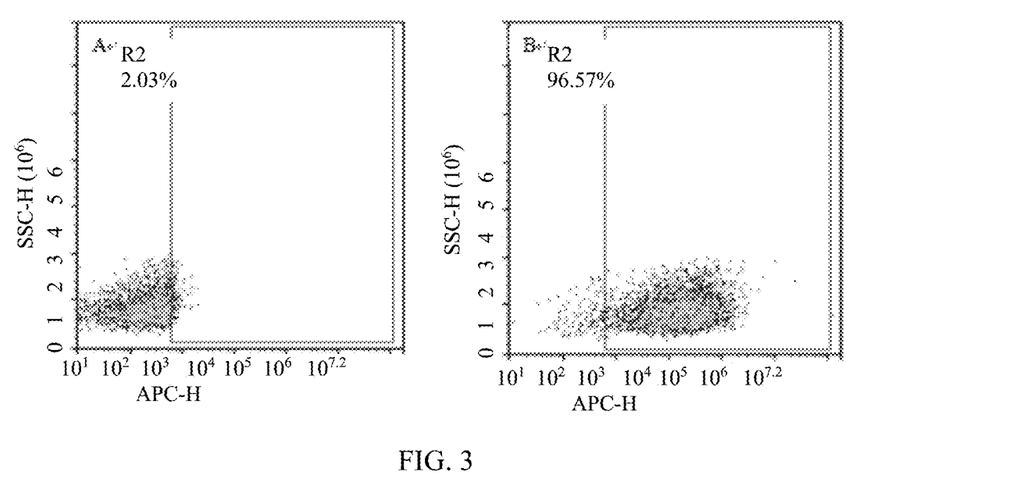
FIG. 3 illustrates a flow cytometry result of CAR-NK-92 provided in Example 4 of the present disclosure, wherein A of FIG. 3 illustrates NK-92 cells without virus infection, and serve as a control; B of FIG. 3 illustrates NK-92 cells that are infected by the virus and then subjected to a flow sort and cultured for 1 month.

After flow sorting, positive CAR-NK-92 cells were continuously cultured. After expanding for 1 month, the positive rate of CAR NK-92 cells was detected by flow cytometry, and the flow cytometry detection result is shown in FIG. 3. The result showed that the positive rate of the CAR-NK92 was 96.57%, indicating that NK-92 cells stably expressing CAR element were successfully prepared (FIG. 3: the positive expression rate of CAR-NK-92 was detected by flow cytometry, wherein A of FIG. 3 illustrates the NK-92 cells without virus infection, and served as a control; and B of FIG. 3 illustrates the NK-92 cells that were infected with virus and then subjected to flow sort and cultured for 1 month. The antibody was labeled with APC fluorescent and was represented on the abscissa. If NK-92 cells successfully expressed the CAR molecules, the signal value would significantly increase).

Example 5: In Vitro Activity Assay of Car Cells

The killing effect of CAR-T and CAR-NK-92 cells on tumor cells were detected with LDH release method, and LDH release was measured with ELISA.

1. Target cells were adjusted to 5×104/mL with RPMI-1640 culture solution containing 5% calf serum.
2. The target cells were added into 96-well cell culture plates with 100 μL per well. Three wells were selected as control of spontaneous release of effector cells (CART cells), which were only added 100 μL of culture medium without adding target cells.

3. 100 μL effector cells were added into each well, wherein the ratio of effector cells to target cells was 10:1; 5:1:1. The wells of spontaneous release were added only with 100 μL of culture medium without adding effector cells. The effector cells were co-incubated with target cells for 6 hours; and three replicate wells were used for each experiment.

4. 10 μL Lysis Solution (10×) was added into the largest release well (positive control), and incubated for 45-60 minutes. Meanwhile, three replicate wells were used for each experiment.

5. 50 μL of each of the test sample and the control sample in the above 3 and 4 steps were taken out and added to a fresh 96-well ELISA plate, then reaction solution and substrate were added to stand for 30 minutes in the dark.

6. Adding 50 μL stop solution.

7. The optical density (OD value) of each well was measured on an enzyme-linked detector at 490 nm or 492 nm within 1 hour.

8. Calculation of specific lysis activity killing rate=experimental group LDH(OD)/max LDH release group(OD).

Specific lysis activity=(experimental group−effect spontaneous release−target spontaneous release)/ (target maximum release−target spontaneous release)×100%     Calculation formula:

9. Determination of cytokine secretion with CBA kit

Figure 4:
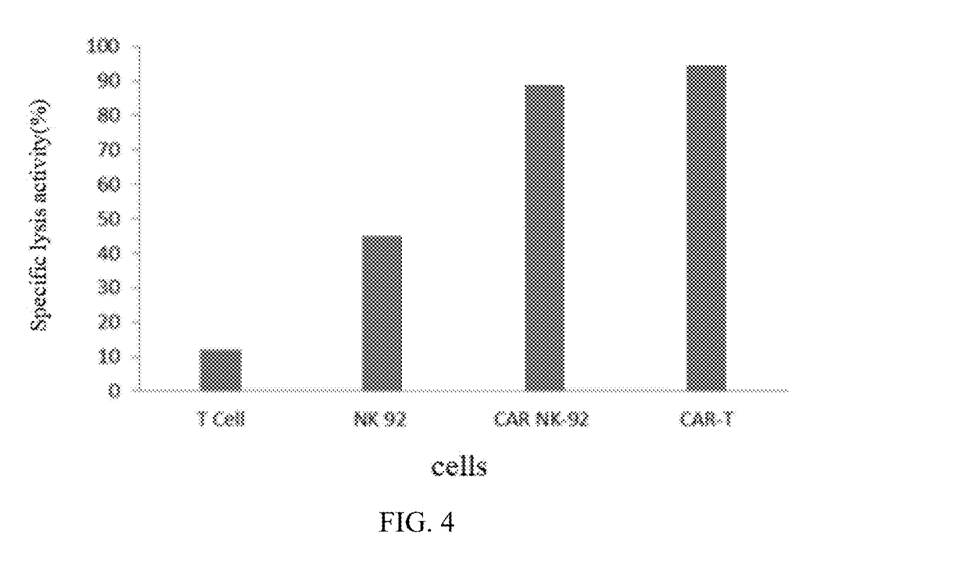
FIG. 4 illustrates an analysis result of the specific lysis activity of CAR-cells provided in Example 5 of the present disclosure.

The analysis result of the Specific lysis activity of the CAR cells is shown in FIG. 4, and the result shows that the constructed CAR-T cells and the CAR-NK-92 cells can remarkably kill tumor cells. The specific lysis activity was 95% and 83% respectively as shown in FIG. 4.

Example 6: In-Vivo Efficacy Testing of Car Cells in Animal

1. Cell Strain: H1299 Lung Cancer Cell Strain (Hereinafter Referred to as H1299 for Short), Stored in Liquid Nitrogen.

2. Experimental Animal 2.1 Animal species, grade, week age, weight and source

NOG mouse, SPF grade, 4-6 weeks old when purchased, 15-25 g of body weight, purchased from Beijing Weitong Lihua Experimental Animal Co. ltd.

2.2 Quarantine and domestication: quarantine inspection was performed by veterinarian after all animals being purchased. The animals were performed quarantine and domesticated for 2-7 days. Only those animals that were qualified by veterinary quarantine can be qualified for further experiment.

2.3 Animal house: barrier animal house (SPF-grade), Suzhou GenePharma Co., Ltd.

2.4 Animal feed, mouse feed (Standard SPF-grade). A nutrient component detection report of the feed was provided by production unit. After being purchased, the feed was subjected to ultraviolet irradiation disinfection and external packaging, and was followed by being placed into barrier environment for cryopreservation. The feed was taken one small packet (2.5 kg) each time, and weighed on demand amount, and then clamped and replaced. The feed should be used up within 2 weeks.

2.5 Animal drinking water: SPF purified water, supplied by drinking water bottle. The animals have free access to water.

2.6 Padding materials of animals: common poplar wood shavings, and use after high-pressure sterilization.

2.7 Feeding condition

The Animals were fed in polycarbonate cage box filled with padding material in individual room. Unless otherwise stated, the animals have free access to food the rest of time, and have free access to water.

In animal house, the room temperature ranged from 20-26° C. and humidity ranged from 40% to 70%, and experienced 12 hours of light at alternating light and darkness. The padding materials were replaced twice a week, and meanwhile, the feeding boxes were replaced. When there is serious contamination such as drinking water, urine, loose stools, etc, the feeding boxes would be replaced in time. The high-pressure disinfected drinking water bottles and bottle plugs were replaced every day. After being cleaned, all the replaced cages were sterilized by autoclaving.

The animal house floor was disinfected at least once every day, and the cage frames and animal house wall were disinfected at least once a week with 0.1% of bromogeramine or 0.5% of 84 disinfection solution, and the two disinfectant solutions were used interchangeably and generally alternated once every week.

3. Experimental Method 3.1 Tumor cell culture and concentration configuration

Tumor cell culture: H1299 cells were cultured in DMEM culture solution containing 10% fetal calf serum. H1299 cells in the exponential growth phase were collected, and suspended in PBS and matrix glue (0.1 mL/animal) (the ratio of PBS to matrix glue is 1:1) for subcutaneous inoculation at a concentration of $5 \times 10^6$ cells/animal.

3.2 Animal grouping and administration dosage

The condition and the treatment of each group of animals were shown in the following table:

TABLE 1

| Group | Number of animals | Drug | administration mode |
|---|---|---|---|
| A | 8 | PBS | I.V. |
| B | 8 | T cell | I.V. |
| C | 8 | PD-1 protein extracellular domain or mutant thereof | I.V. |
| D | 8 | ROBO1 CAR-T (Preparation method can see patent application CN105907719A and PCT/CN2016/092578) | I.V. |
| E | 8 | ROBO1-(protein extracellular domain or mutant thereof) CAR-T (prepared by Example 3 of the present disclosure) | I.V. |

Animal grouping and administration

4. Detection Indicator 4.1 General clinical observation

The observation time: one time every morning and every afternoon in one day.

Observation contents: tumor growth status and systemic status of rats were observed every two days after inoculation, and the contents included recording the formation time and growth status of tumor, and observed general activities, death, manure and the like of rats.

4.2 Body weight

Weighing time: the animal was weighed once at the time of being received, and weighed once a week after the start of the experiment, and weighed and recorded when the animals were dead or endangered.

Testing Animals: all animals 4.3 Tumor measurement

Figure 5:
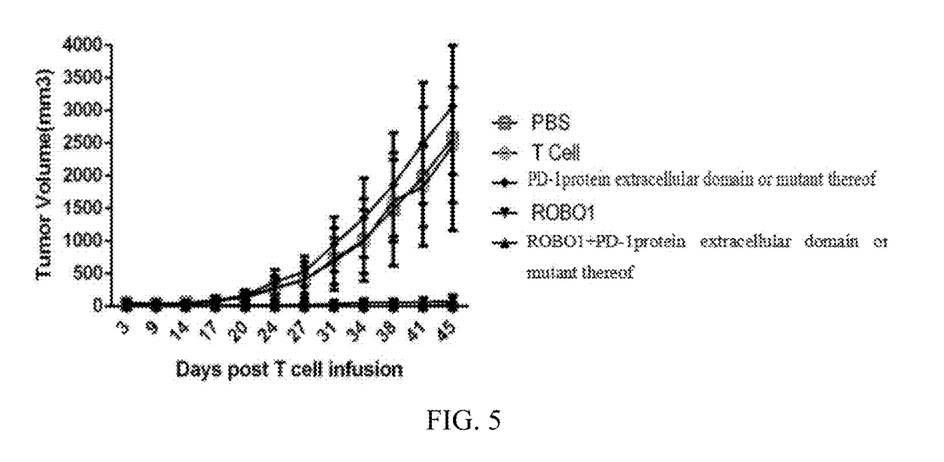
FIG. 5 illustrates a result of efficacy evaluation of the drug provided in Example 6 of the present disclosure in mouse tumor models.
Figure 6:
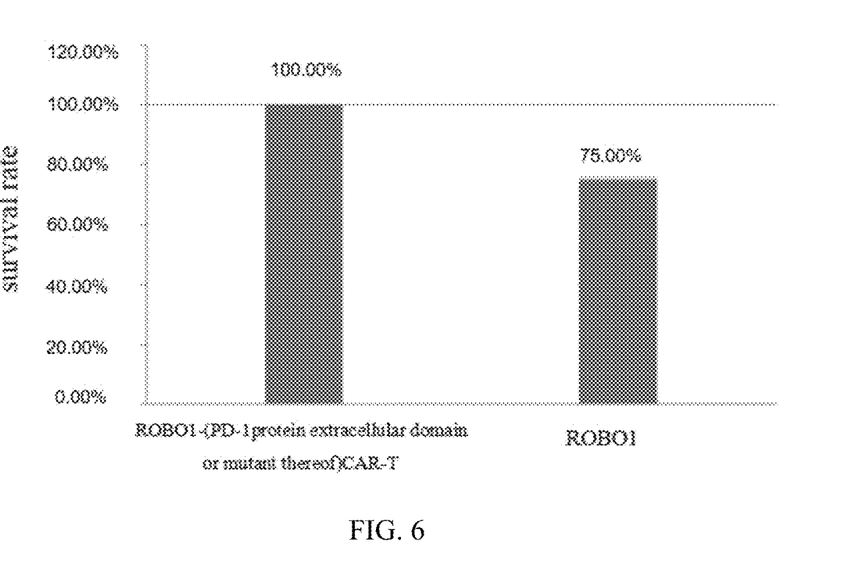
FIG. 6 illustrates the survival rate for ROBO1-(PD-1 protein extracellular domain or mutants thereof) CAR-T group and the ROBO1 CAR-T group, respectively, at the end point of the experiment provided in Example 6 of the present disclosure.
Figure 7:
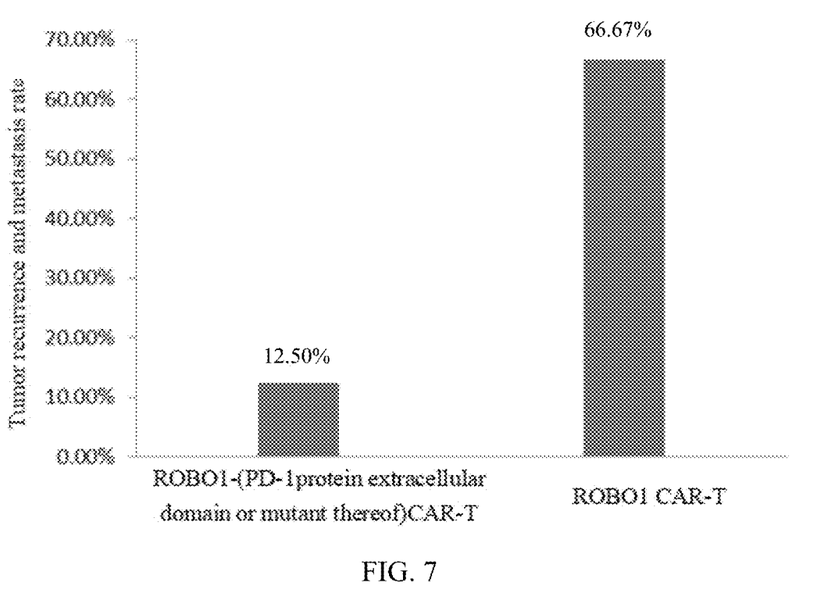
FIG. 7 illustrates the tumor recurrence rate for ROBO1-(PD-1 protein extracellular domain or mutants thereof) CAR-T group and the ROBO1 CAR-T group, respectively, at the end point of the experimental provided in Example 6 of the present disclosure.

The length diameter and short diameter of the tumor were measured by vernier caliper every two days, and the volume of the tumor was calculated as follows: the volume (mm3)

=length diameter (mm)×short diameter (mm²)/2. It's growth curve was depicted from the average value, as shown in FIG. 5.

5. Data Acquisition and Statistical Analysis 5.1 Data acquisition

The measured and observed result and data required for the scheme were recorded on appropriate tables by hand or the data can be acquired directly by computer.

5.2 Data analysis

Statistical software SPSS 20.0 was used to process data in the experiment, and the data were expressed by means of an average value±standard deviation. The specific analysis process was as follows:

The homogeneity of variance was checked by levene's test, and if the variance was homogeneous (P>0.05), statistical analysis was carried out in one-way ANOVA. If the ANOVA was statistically significant (P≤0.05), comparative analysis was carried out by LSD test (parameter method).

If the variance was not homogeneous (P≤0.05), kruskal-Walis test was used. If the kruskal-Wallis test has statistical significance (P≤0.05), comparison between any two means was carried out by Mann-Whitney method.

The result showed that the ROBO1-(PD-1 protein extracellular domain or mutant thereof) CAR-T group and ROBO1CAR-T group had significant killing tumor activity compared to the control group. However, when the animal tumor recurrence rate and animal survival rate of ROBO1-(PD-1 protein extracellular domain or mutant thereof) CAR-T group and ROBO1CAR-T group were compared at the end point of the experiment, the results showed that the recurrence rate for ROBO1-(PD-1 protein extracellular domain or mutant thereof) CAR-T group was 12.5% (recurrence occurred only in 1 mouse among 8 mice), and the survival rate was 100%. While the survival rate of the ROBO1CAR-T group was 75% (6 mice survived in 8 mice), the recurrence rate was 66.7% (Tumor recurrence occurred in 4 mice of the 6 survival mice). The result showed that the introduction of PD-1 protein extracellular domain or mutant molecules of blocking the PD-1 and PD-L1 into CAR structure, can significantly reduce the tumor recurrence after the tumor was treated with CAR, and meanwhile has remarkable significance on improvement of the safety of CAR drugs.

The above descriptions are only preferred embodiments of the present disclosure, and are not intended to limit the present disclosure. Any modification, equivalent replacement and the like falling within the spirit and principle of the present disclosure, should be all included within the protection scope of the disclosure.

What is claimed is:

1. A CAR-cell, expressing an extracellular secretory protein and a chimeric antigen receptor, wherein the chimeric antigen receptor comprises an antigen-binding domain, a transmembrane domain and a costimulatory signaling region, and the antigen-binding domain is capable of specifically binding to FN3 domain of the tumor specific antigen ROBO1, and activating immune cells through the transmembrane domain and the costimulatory signaling region; the extracellular secretory protein is capable of preventing or inhibiting the binding of the wild type PD-1 protein to PD-L1 ligand;

the extracellular secretory protein is the extracellular domain of PD-1 protein or the mutant of the extracellular domain, and the mutant of the extracellular domain is capable of binding PD-L1 with high affinity;
the transmembrane domain is CD8 transmembrane domain, the costimulatory signaling region is 4-1BB and CD3 ζ intracellular domains; the structure of the chimeric antigen receptor is anti-ROBO1-FN3 scFv-CD8 transmembrane-4-1BB-CD3 ζ;
a nucleotide encoding IRES (internal ribosome entry site) is located between a nucleotide encoding chimeric antigen receptor and a nucleotide encoding extracellular secretory protein,
a polynucleotide comprises a nucleotide encoding anti-ROBO1-FN3 scFv-CD8 transmembrane-4-1BB-CD3 ζ-IRES-(the extracellular domain of PD-1 protein or mutant thereof), which has a sequence as shown in SEQ ID NO: 7.

2. The CAR-cell according to claim 1, wherein the antigen-binding domain is an antigen-binding fragment, the antigen-binding fragment is scFv; and the anti-ROBO1-FN3 scFv has an amino acid sequence as shown in SEQ ID NO:9.

3. The CAR-cell according to claim 1, wherein the extracellular domain of PD-1 protein or the mutant thereof has an amino acid sequence as shown in SEQ ID NO: 8.

4. The CAR-cell according to claim 1, wherein the antigen-binding domain is encoded by a nucleotide sequence as shown in SEQ ID NO: 2.

5. The CAR-cell according to claim 1, wherein the extracellular domain or the mutant thereof is encoded by a nucleotide sequence as shown in SEQ ID NO: 1.

6. The CAR-cell according to claim 1, wherein the nucleotide encoding chimeric antigen receptor and the nucleotide encoding extracellular secretory protein are not in the same reading frame.

7. The CAR-cell according to claim 1, wherein the IRES is encoded by a nucleotide sequence as shown in SEQ ID NO: 3.

8. The CAR-cell according to claim 1, wherein the CD8 transmembrane domain has an amino acid sequence as shown in SEQ ID NO:10.

9. The CAR-cell according to claim 1, wherein the 4-1BB intracellular domain has an amino acid sequence as shown in SEQ ID NO: 11; and the CD3ζ intracellular domain has an amino acid sequence as shown in SEQ ID NO:12.

10. The CAR-cell according to claim 9, wherein the CD8 transmembrane domain is encoded by a nucleotide sequence as shown in SEQ ID NO: 4;
the 4-1BB intracellular domain is encoded by a nucleotide sequence as shown in SEQ ID NO: 5; and/or
the CD3 ζ intracellular domain is encoded by a nucleotide sequence as shown in SEQ ID NO: 6.

11. The CAR-cell according to claim 10, wherein the anti-ROBO1-FN3 scFv-CD8 transmembrane-4-1BB-CD3ζ is encoded by a nucleotide sequence as shown in SEQ ID NO: 13.

12. The CAR-cell according to claim 1, wherein the CAR-cells are immune cells, and are selected from one or more of T cells, NK cells, CTL cells and regulatory T cells.

13. The CAR-cell according to claim 12, wherein the T cell is a human T cell, and/or the NK cells are human NK cells, and/or, the NK cells are NK92 cells.

* * * * *